US010762547B2

(12) United States Patent
Katagiri

(10) Patent No.: US 10,762,547 B2
(45) Date of Patent: Sep. 1, 2020

(54) DEVICE FOR PROVIDING INFORMATION, METHOD FOR PROVIDING INFORMATION, PROGRAM FOR PROVIDING INFORMATION, AND COMPUTER-READABLE RECORDING MEDIUM STORING PROGRAM FOR SAME

(75) Inventor: Yoko Katagiri, Shinagawa-ku (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 652 days.

(21) Appl. No.: 14/235,632

(22) PCT Filed: Feb. 27, 2012

(86) PCT No.: PCT/JP2012/054807
§ 371 (c)(1),
(2), (4) Date: Apr. 4, 2014

(87) PCT Pub. No.: WO2013/018389
PCT Pub. Date: Feb. 7, 2013

(65) Prior Publication Data
US 2015/0012387 A1 Jan. 8, 2015

(30) Foreign Application Priority Data
Jul. 29, 2011 (JP) .................................. 2011-167295

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0629* (2013.01); *G06Q 30/02* (2013.01); *G06Q 30/06* (2013.01)

(58) Field of Classification Search
CPC ................. G06Q 30/0601–0645; G06Q 30/80
(Continued)

(56) References Cited

U.S. PATENT DOCUMENTS 6,076,070 A 6/2000 Stack
7,685,074 B2 3/2010 Linden et al.
(Continued)

FOREIGN PATENT DOCUMENTS

CN 101124600 A 2/2008
JP 2002-521754 A 7/2002
(Continued)

OTHER PUBLICATIONS

Sheeran, Kathy "Lining up travel online," Sunday Herald-Sun (Melbourne, Vic), Jul. 24, 2011.*
(Continued)

*Primary Examiner* — Brandy A Zukanovich
(74) *Attorney, Agent, or Firm* — Sughrue Mion, PLLC

(57) ABSTRACT

An information providing device includes a specifying unit that specifies a second trading object related to a second trading object page to be compared with a first trading object related to a first trading object page to be displayed on a user terminal, a comparison unit that extracts first trading object information corresponding to the first trading object and second trading object information corresponding to the second trading object from a page information database that stores trading object information corresponding to trading objects, and compares the first and second trading object information, and a page transmitting unit that presents comparison information indicating a result of comparison to a user. The second trading object page is a webpage displayed on the user terminal prior to the first trading object page.

11 Claims, 15 Drawing Sheets

(58) Field of Classification Search
USPC ..... 705/26.1, 27.1, 26.2, 26.25, 26.3, 26.35, 705/26.4, 26.41, 26.42, 26.43, 26.44, 705/26.5, 26.6, 26.61, 26.62, 26.63, 705/26.64, 26.7, 26.8, 26.81, 26.82, 26.9, 705/27.2
See application file for complete search history.

(56) References Cited

U.S. PATENT DOCUMENTS

| | | |
|---|---|---|
| 2006/0031774 A1 | 2/2006 | Gaudette |
| 2006/0167757 A1 | 7/2006 | Holden et al. |
| 2006/0212362 A1* | 9/2006 | Donsbach ............... G06Q 30/06 705/26.64 |

FOREIGN PATENT DOCUMENTS

| | | |
|---|---|---|
| JP | 2004-126931 A | 4/2004 |
| JP | 2008-529137 A | 7/2008 |
| WO | 2006079008 A | 7/2006 |

OTHER PUBLICATIONS

Taiwanese Office Action dated Jul. 4, 2014 issued in Taiwanese Patent Application No. 101106592.
Kakaku.com, Inc. "Kakaku.com" [online], Internet <URL: http://kakaku.com/>.
International Search Report for PCT/JP2012/054807 dated May 15, 2012.
Communication dated Nov. 5, 2019 from the European Patent Office in Application No. 12820473.2.
Developer Express Inc. info@devexpress.Com, "Q149067—ASPxPageControl ActiveTabChanged Event | DevExpress Support", Mar. 18, 2009, XP055635426, URL:https://www.devexpress.com/Support/Center/Question/Details/Q149067/aspxpagecontrol-activetabchanged-event [retrieved on Oct. 23, 2019] (total 1 page).
Anonymous, "ASPxTabControlBase.ActiveTabChanged Event | ASP.NET, Controls and MVC Extensions | DevExpress Help", Jan. 1, 2009, XP055635427, URL:https://documentation.devexpress.com/AspNet/DevExpress.Web.ASPxTabControlBase.ActiveTabChanged.event, [retrieved on Oct. 23, 2019] (total 2 pages).

* cited by examiner

*Fig.2*

| OFFERER ID | TRADING OBJECT ID | URL | TRADING OBJECT INFORMATION (PROVIDED INFORMATION) |
|---|---|---|---|
| 1001 | A001 | http://··· | ··· |
| 1001 | A002 | http://··· | ··· |
| 1002 | B001 | http://··· | ··· |
| ··· | ··· | ··· | ··· |

Fig.3

| USER ID | OFFERER ID | TRADING OBJECT ID | URL | VIEWING DATE AND TIME |
|---|---|---|---|---|
| U001 | 1001 | A001 | http://... | 2011/7/10 20:00:00 |
| U001 | 1002 | B010 | http://... | 2011/7/10 20:05:00 |
| U002 | 1010 | C001 | http://... | 2011/7/10 20:20:00 |
| U003 | 1001 | A002 | http://... | 2011/7/10 20:20:00 |
| ... | ... | ... | ... | ... |

| FACILITY NAME | HOTEL A |
|---|---|
| ADDRESS | ... |
| CHECK-IN | 15:00 |
| CHECK-OUT | 10:00 |
| ACCESS | PARKING AVAILABLE |
| FEATURE FACILITIES | RESTAURANT, TEA LOUNGE, SHOP, OPEN-AIR BATH, LAUNDRY SERVICE, ... |
| ... | ... |

| FACILITY NAME | INN B |
|---|---|
| ADDRESS | ... |
| CHECK-IN | 15:00 |
| CHECK-OUT | 11:00 |
| ACCESS | COURTESY BUS AVAILABLE |
| FEATURE FACILITIES | RESTAURANT, TEA LOUNGE, SHOP, OPEN-AIR BATH (RESERVED), HOT SPRING, ... |
| ... | ... |

(b)

| FACILITY NAME | INN B |
|---|---|
| ADDRESS | ... |
| CHECK-IN | 15:00 |
| CHECK-OUT | 11:00 |
| ACCESS | COURTESY BUS AVAILABLE |
| FEATURE FACILITIES | RESTAURANT, TEA LOUNGE, SHOP, OPEN-AIR BATH (RESERVED), HOT SPRING, ... |
| ... | ... |

| FACILITY NAME | HOTEL A |
|---|---|
| ADDRESS | ... |
| CHECK-IN | 15:00 |
| CHECK-OUT | 10:00 |
| ACCESS | PARKING AVAILABLE |
| FEATURE FACILITIES | RESTAURANT, TEA LOUNGE, SHOP, OPEN-AIR BATH, LAUNDRY SERVICE, ... |
| ... | ... |

Fig.7
(a)
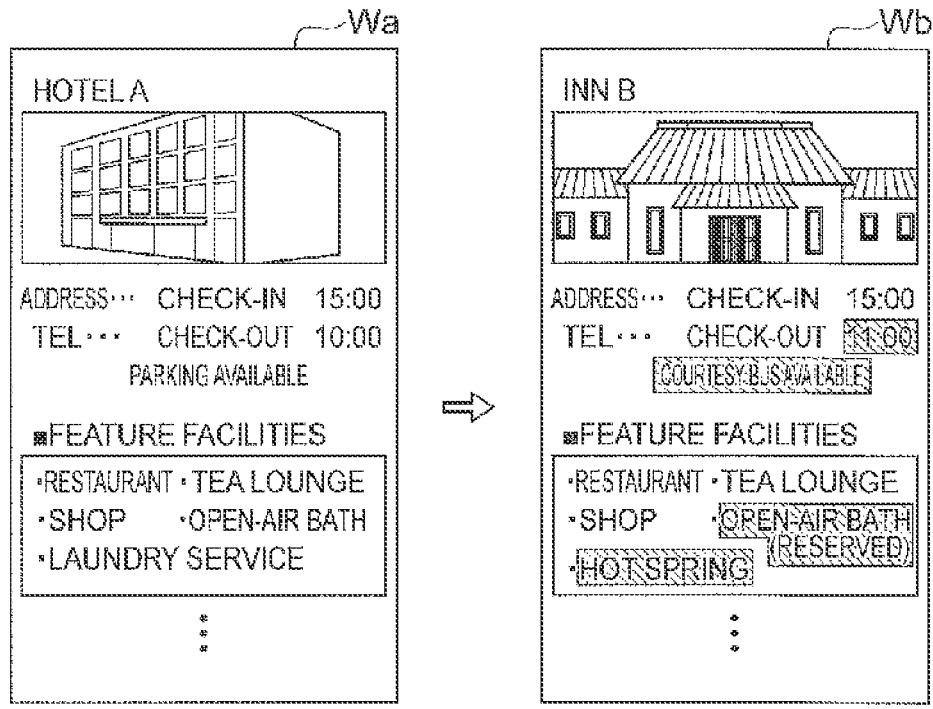
(b)
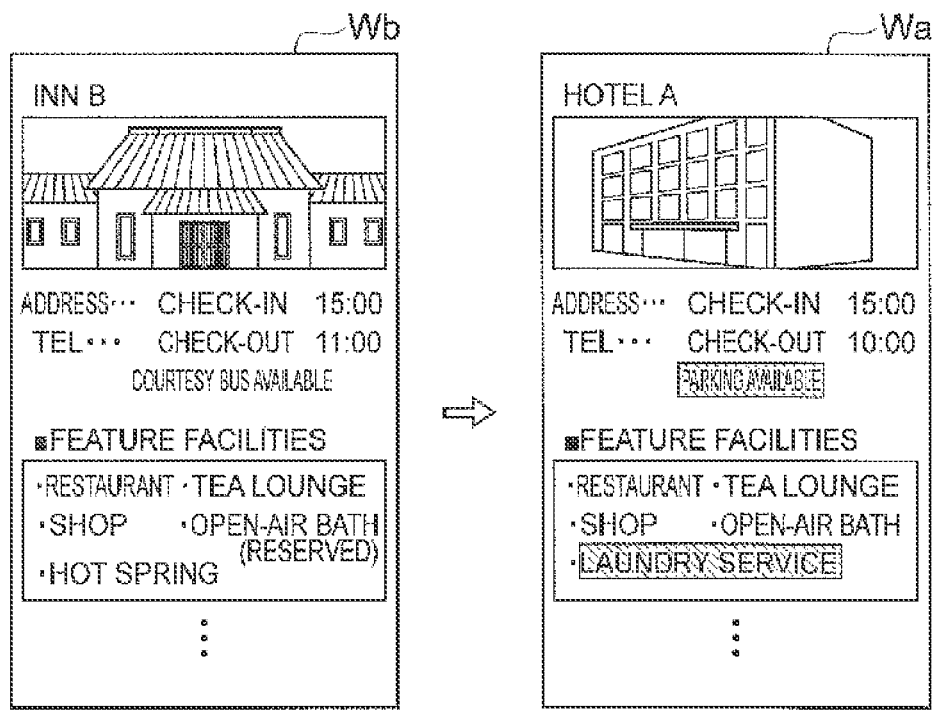

Fig. 13

| OFFERER ID | TRADING OBJECT ID | URL | POSSIBLE CHANGES |
|---|---|---|---|
| 1001 | A001 | http://... | CHECK-OUT TIME: 10:00→11:00 OR 12:00 |
| 1001 | A002 | http://... | PRICE: ¥30,000→¥20,000 OR ¥15,000 |
| ... | ... | ... | ... |
| | | | COURTESY BUS: NOT AVAILABLE→AVAILABLE |
| | | | WELCOME DRINK: NOT INCLUDED→INCLUDED |
| | | | ... |

24

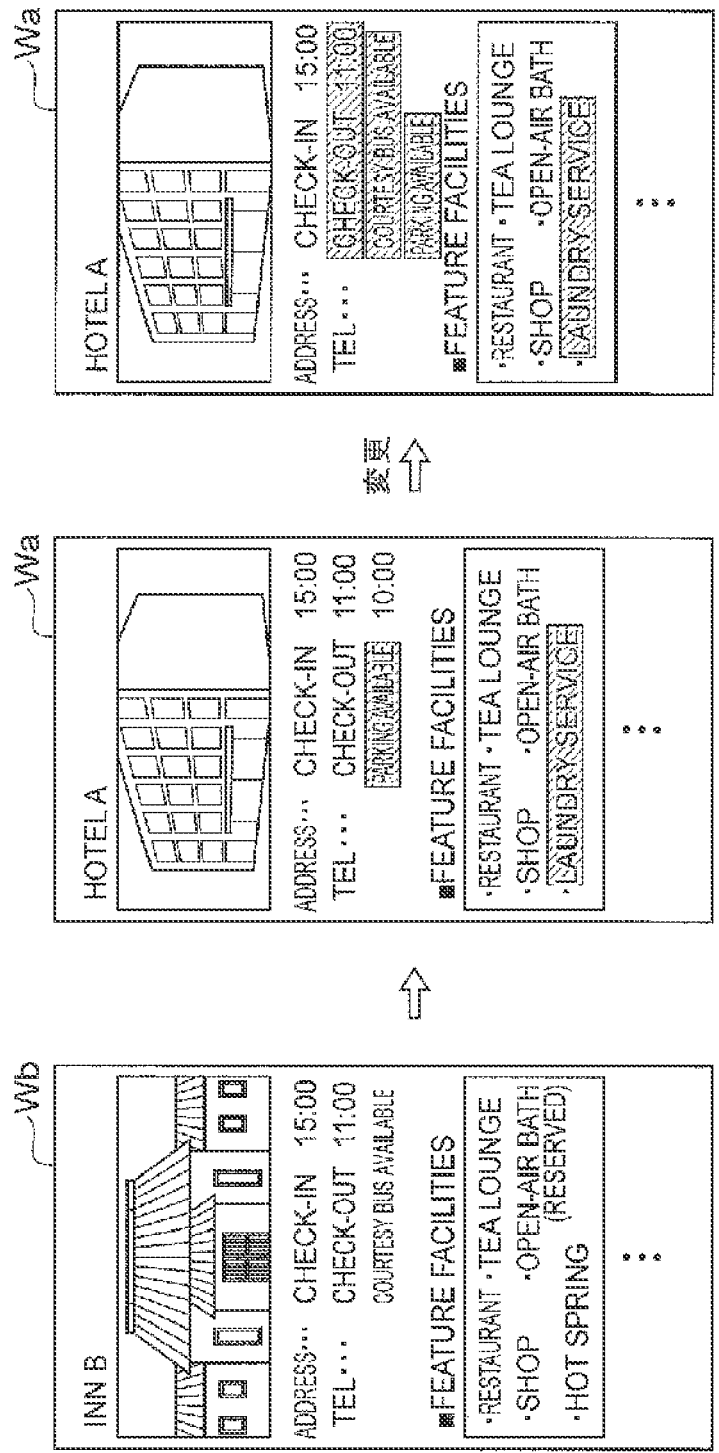

… (1)

DEVICE FOR PROVIDING INFORMATION, METHOD FOR PROVIDING INFORMATION, PROGRAM FOR PROVIDING INFORMATION, AND COMPUTER-READABLE RECORDING MEDIUM STORING PROGRAM FOR SAME

CROSS REFERENCE TO RELATED APPLICATIONS

This application is a National Stage of International Application No. PCT/JP2012/054807 filed Feb. 27, 2012, claiming priority based on Japanese Patent Application No. 2011-167295 filed Jul. 29, 2011, the contents of all of which are incorporated herein by reference in their entirety.

TECHNICAL FIELD

One embodiment of the present invention relates to an information providing device, an information providing method, an information providing program, and a computer-readable recording medium storing the program for providing useful information to a user who views item information.

BACKGROUND ART

Frameworks that allow users to make a comparison between trading objects have been known. For example, the website described in the following Non Patent Literature 1 has a function of displaying a comparative table of items when a user places a checkmark for two or more given items included in a list of items, which are trading objects, and presses "Compare" button.

CITATION LIST

Non Patent Literature

NPL 1: Kakaku.com, Inc. "Kakaku.com" [online], Internet <URL: http://kakaku.com/>

SUMMARY OF INVENTION

Technical Problem

However, in the website described in the above Non Patent Literature 1, a user needs to place a checkmark for items to be compared and press "Compare" button, which is a little troublesome. Accordingly, it is desired to allow a user to easily make a comparison between trading objects.

Solution to Problem

An information providing device according to one aspect of the invention includes a specifying unit that specifies a second trading object related to a second trading object page to be compared with a first trading object related to a first trading object page to be displayed on a user terminal by referring to a viewing history storage unit that stores a viewing history of trading object pages by a user, the second trading object page being a webpage displayed on the user terminal prior to the first trading object page, a comparison unit that extracts first trading object information corresponding to the first trading object and second trading object information corresponding to the second trading object from a trading object storage unit that stores trading object information corresponding to trading objects, and compares the first and second trading object information, and a presentation unit that presents comparison information indicating a result of comparison by the comparison unit to the user.

An information providing method according to one aspect of the invention is an information providing method executed by an information providing device, the method including a specifying step of specifying a second trading object related to a second trading object page to be compared with a first trading object related to a first trading object page to be displayed on a user terminal by referring to a viewing history storage unit that stores a viewing history of trading object pages by a user, the second trading object page being a webpage displayed on the user terminal prior to the first trading object page, a comparison step of extracting first trading object information corresponding to the first trading object and second trading object information corresponding to the second trading object from a trading object storage unit that stores trading object information corresponding to trading objects and comparing the first and second trading object information, and a presentation step of presenting comparison information indicating a result of comparison in the comparison step to the user.

An information providing program according to one aspect of the invention causes a computer to implement a specifying unit that specifies a second trading object related to a second trading object page to be compared with a first trading object related to a first trading object page to be displayed on a user terminal by referring to a viewing history storage unit that stores a viewing history of trading object pages by a user, the second trading object page being a webpage displayed on the user terminal prior to the first trading object page, a comparison unit that extracts first trading object information corresponding to the first trading object and second trading object information corresponding to the second trading object from a trading object storage unit that stores trading object information corresponding to trading objects, and compares the first and second trading object information, and a presentation unit that presents comparison information indicating a result of comparison by the comparison unit to the user.

A computer-readable recording medium according to one aspect of the invention stores an information providing program that causes a computer to implement a specifying unit that specifies a second trading object related to a second trading object page to be compared with a first trading object related to a first trading object page to be displayed on a user terminal by referring to a viewing history storage unit that stores a viewing history of trading object pages by a user, the second trading object page being a webpage displayed on the user terminal prior to the first trading object page, a comparison unit that extracts first trading object information corresponding to the first trading object and second trading object information corresponding to the second trading object from a trading object storage unit that stores trading object information corresponding to trading objects, and compares the first and second trading object information, and a presentation unit that presents comparison information indicating a result of comparison by the comparison unit to the user.

According to the above aspect, the second trading object to be compared with the first trading object that is displayed next is specified based on the viewing history, and the trading object information for the both trading objects are compared. Then, the comparison result is presented to a user. In this manner, by automatically extracting the comparison result of the trading object information viewed by a user and presenting it to the user, the user can compare the trading objects more easily.

In the information providing device according to another aspect, the specifying unit may specify at least one of trading object pages having been displayed during a period from when the first trading object page has been displayed before to when the first trading object page has been displayed next as the second trading object page. In this manner, by specifying an object to be compared in consideration of page transition, it is possible to accurately estimate the trading objects to be compared by a user.

In the information providing device according to another aspect, the specifying unit may specify at least one of trading object pages having been displayed for a specified period of time or longer within a specified range of time as the second trading object page. In this manner, by specifying an object to be compared in consideration of display time, it is possible to accurately estimate the trading objects to be compared by a user.

In the information providing device according to another aspect, the comparison information may be displayed on the first trading object page. By displaying the comparison result within the first trading object page, the comparison result is more easily viewable.

In the information providing device according to another aspect, the comparison information may contain difference information indicating a difference between the first trading object information and the second trading object information, and the difference information may be displayed on the user terminal in a manner that at least one of an item where the first trading object information is more advantageous than the second trading object information and an item where the first trading object information is more disadvantageous than the second trading object information is visually recognizable based on preset relative merits of item values.

In the information providing device according to another aspect, the information providing device may further include a generation unit that generates the first trading object page, the comparison information may contain difference information indicating a difference between the first trading object information and the second trading object information, the generation unit may change a value of an item where the first trading object information is more disadvantageous than the second trading object information on the first trading object page to a value being the same as or a value being more advantageous than the corresponding value in the second trading object page based on preset relative merits of item values, and the presentation unit may present the first trading object page where the value of the disadvantageous item has changed by the generation unit.

In this case, a display item in the first trading object page which is disadvantageous compared to information in the second trading object page displayed in the past is changed to a value that is more advantageous than an initial value based on the corresponding value in the second trading object page. A user can thereby obtain more favorable information.

In the information providing device according to another aspect, the generation unit may calculate an order rate of a trading object indicated by the first trading object page by referring to a stock storage unit that stores the number of stocks and the number of orders of trading objects, and when the order rate is equal to or less than a first threshold, change the value of the disadvantageous item to the corresponding value.

In the information providing device according to another aspect, the generation unit may calculate an order rate of a trading object indicated by the first trading object page by referring to a stock storage unit that stores the number of stocks and the number of orders of trading objects, and when the order rate is equal to or less than a second threshold being smaller than the first threshold, change the value of the disadvantageous item to a more advantageous value than the corresponding value.

In the information providing device according to another aspect, the generation unit may determine whether an offerer corresponding to the first trading object information and an offerer corresponding to the second trading object information have a specified relationship by referring to preset relationship information indicating a specified relationship between offerers who offer trading objects, and when the both offerers have the specified relationship, change the value of the disadvantageous item based on the corresponding value in the second trading object page.

Advantageous Effects of Invention

According to one aspect of the present invention, a user can easily make a comparison between trading objects.

BRIEF DESCRIPTION OF DRAWINGS

FIG. 2 is a diagram showing an example of page information.

FIG. 3 is a diagram showing an example of viewing information.

FIGS. 6(*a*) and 6(*b*) are diagrams showing an example of comparison between pages.

FIGS. 7(*a*) and 7(*b*) are diagrams showing a display example of the next page.

FIG. 13 is a diagram showing an example of changes information.

FIG. 15 is a diagram showing an example of the next page where a part of information has changed.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First Embodiment

The functions and configuration of an information providing system 1 according to the first embodiment are described firstly with reference to FIGS. 1 to 7. The information providing system 1 is a computer system that offers a website (virtual shopping mall, reservation site etc.) on which information about trading objects such as items and public facilities is provided to users. The type of a trading object is not limited and, accordingly, the type of a website to which this embodiment is applied is also not limited. For example, a trading object may be a tangible or intangible product (service) or use of a room of accommodation facilities or golf courses.

Figure 1:
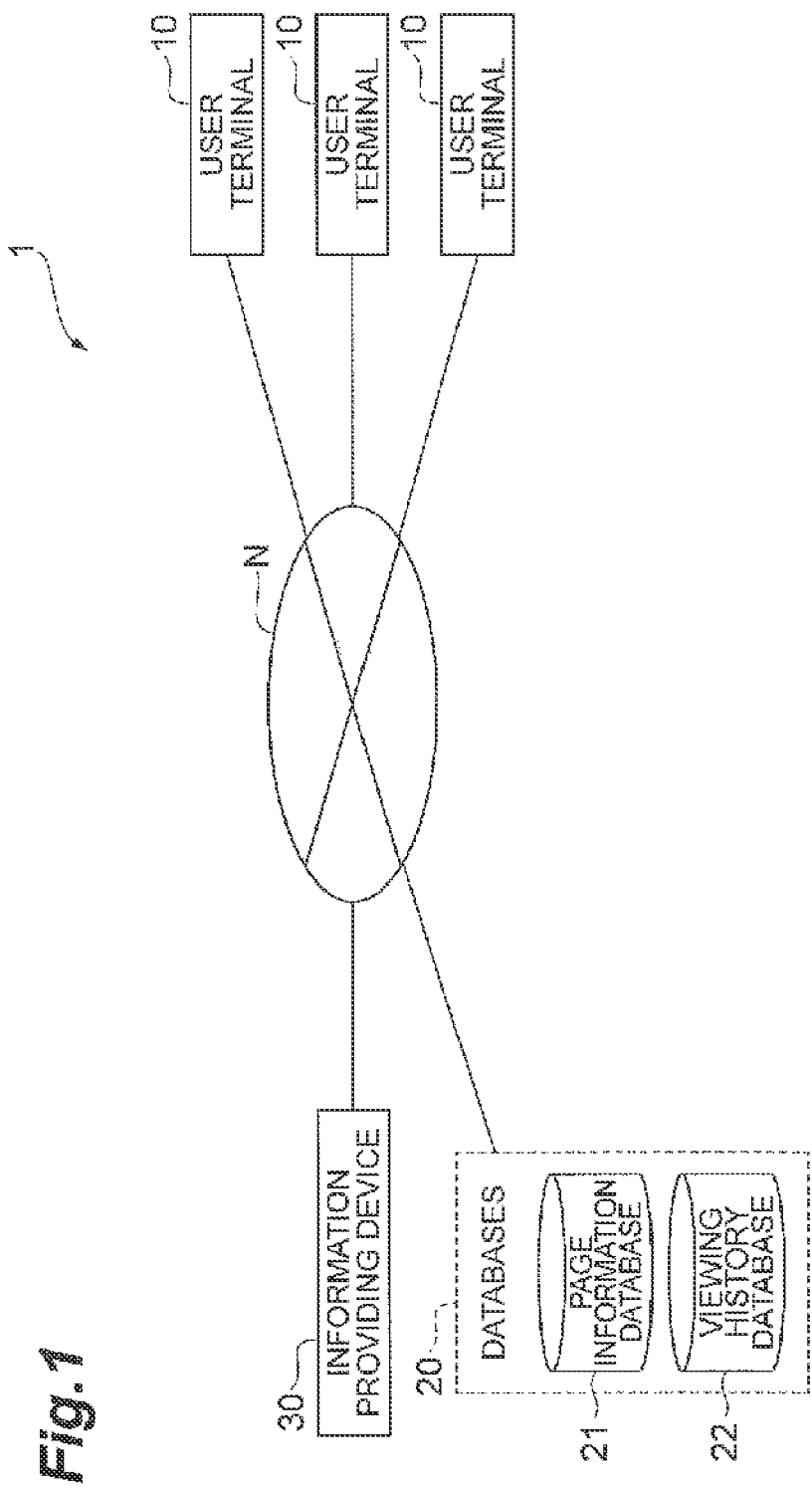
FIG. 1 is a diagram showing an overall configuration of an information providing system according to a first embodiment.

As shown in FIG. 1, the information providing system 1 includes user terminals 10, databases 20, and an information providing device 30. The user terminals 10, the databases 20 and the information providing device 30 can communicate with one another through a communication network N, which is the Internet, a wireless LAN, a mobile communication network or the like. Although three user terminals 10 are shown in FIG. 1, the number of user terminals 10 in the accommodation reservation system 1 is arbitrary.

The user terminals 10 are terminals owned by users who view websites. Examples of the user terminals 10 include advanced mobile phones (smart phones), personal digital assistants (PDA), personal computers (PC) and the like, though the variety of the mobile terminals is not limited thereto. A user can access a website by operating the user terminal 10 to view information about trading objects or order purchase or reservation of a desired trading object.

The databases 20 are a means of storing various information that are used in the information providing system 1. The databases 20 include a page information database (trading object storage unit) 21 and a viewing history database (viewing history storage unit) 22.

The page information database 21 is a means of storing page information that contains information about trading objects (trading object information) that is provided on a webpage of a trading object (trading object page). As shown in FIG. 2, the page information contains an offerer ID that identifies an offerer of a trading object, a trading object ID that identifies a trading object, URL (Uniform Resource Locator) of a trading object page, and trading object information. The trading object information contains an item name, a store name, a price, detailed specifications of an item, specific descriptions of a service and the like. For example, when a trading object is a room of an accommodation facility, the trading object information contains information about a facility name, address, check-in time, check-out time, the number of rooms, access, feature facilities in the facility building, feature facilities in the facility room, awards, available credit card, nearby facilities and recreation and the like. The content of the trading object information can be determined arbitrarily on the basis of the type of a trading object, the policy of information provision on a website and the like.

The viewing history database 22 is a means of storing viewing information indicating that a user has viewed a trading object page. The viewing information is registered when the user terminal 10 accesses a trading object page in the site. As shown in FIG. 3, the viewing information contains a user ID that identifies a user, an offerer ID, a trading object ID, URL of an accessed trading object page, and viewing date and time.

Note that the structure of each database is not limited to the above example, and each database may be normalized or made redundant by an arbitrary policy.

On the assumption of the above, the information providing device 30 is described hereinafter. The information providing device 30 is a computer that provides a trading object page to the user terminal 10 in response to a request from the user terminal 10.

Figure 4:
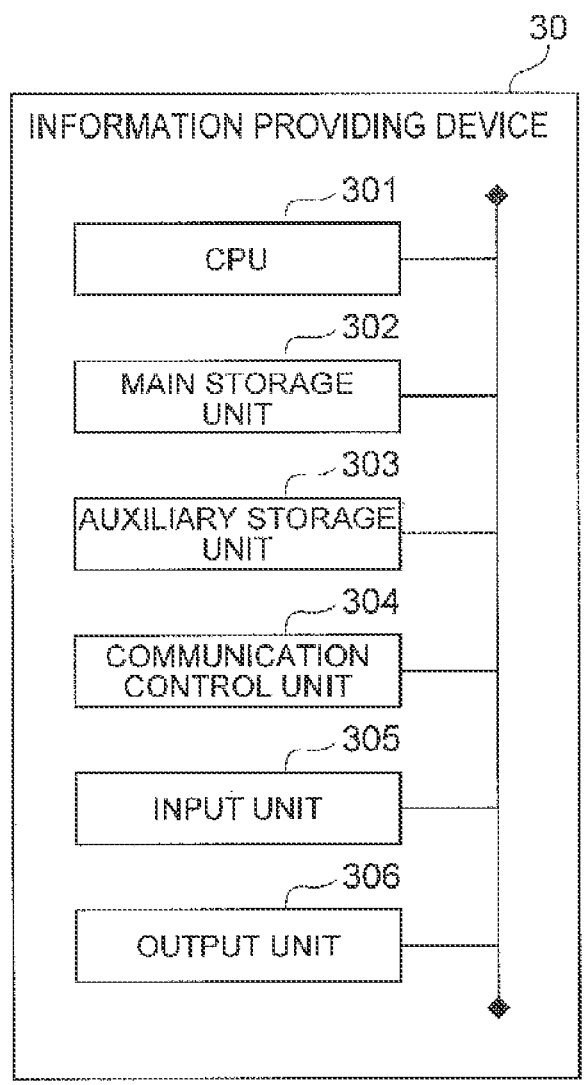
FIG. 4 is a diagram showing a hardware configuration of an information providing device shown in FIG. 1.

As shown in FIG. 4, the information providing device 30 is composed of a CPU 301 that executes an operating system, an application program and the like, a main storage unit 302 such as ROM and RAM, an auxiliary storage unit 303 such as a hard disk, a communication control unit 304 such as a network card, an input unit 305 such as a keyboard and a mouse, and an output unit 306 such as a display.

The functional components of the information providing device 30 described later are implemented by loading given software onto the CPU 301 or the main storage unit 302, making the communication control unit 304, the input device 305, the output device 306 and the like operate under control of the CPU 301, and performing reading and writing of data in the main storage unit 302 or the auxiliary storage unit 303. The data and database required for processing are stored in the main storage unit 302 or the auxiliary storage unit 303. Note that, although the information providing device 30 is composed of one computer in FIG. 4, the functions of the information providing device 30 may be distributed among a plurality of computers.

Figure 5:
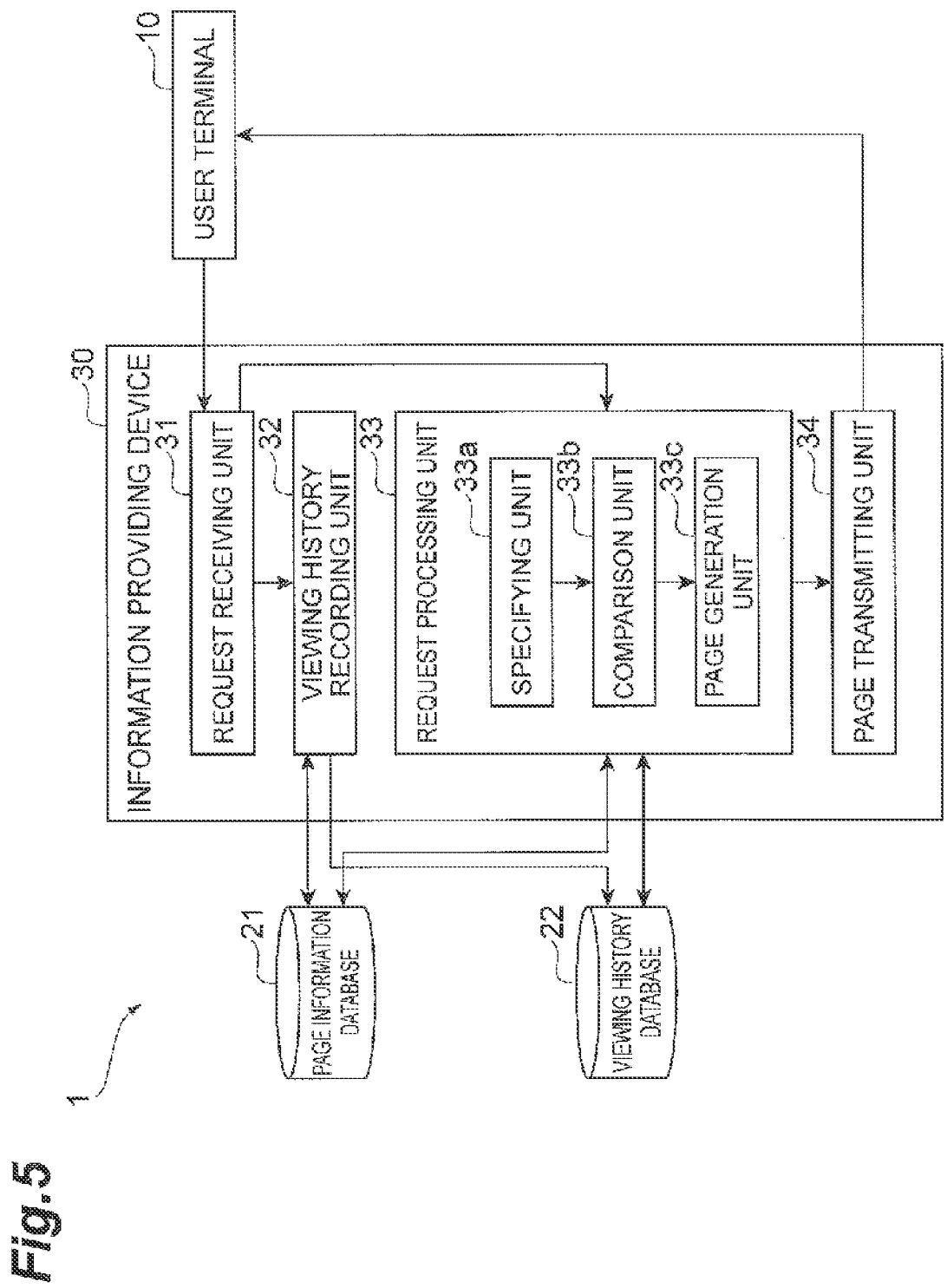
FIG. 5 is a block diagram showing a functional configuration of the information providing device shown in FIG. 1.

As shown in FIG. 5, the information providing device 30 includes, as functional components, a request receiving unit 31, a viewing history recording unit 32, a request processing unit 33, and a page transmitting unit (presentation unit) 34.

The request receiving unit 31 is a means of receiving an HTTP (Hypertext Transfer Protocol) request from the user terminal 10 that requests a trading object page. The HTTP request contains a user ID and URL of a requested trading object page. The request receiving unit 31 outputs the HTTP request to the viewing history recording unit 32 and the request processing unit 33.

The viewing history recording unit 32 is a means of generating viewing information and storing it into the viewing history database 22. The viewing history recording unit 32 reads an offerer ID and a trading object ID corresponding to the URL indicated by the input HTTP request from the page information database 21. The viewing history recording unit 32 then generates viewing information by associating the user ID and the URL extracted from the HTTP request, the read offerer ID and trading object ID, and viewing data and time obtained from the system time, and records the viewing information in the viewing history database 22.

The request processing unit 33 is a means of generating a trading object page corresponding to an input HTTP request. The request processing unit 33 includes a specifying unit 33a, a comparison unit 33b, and a page generation unit 33c.

The specifying unit 33a is a means of specifying a past page to be compared with a trading object page (first trading object page; which is referred to hereinafter as the "next page") indicated by the URL contained in the HTTP request. The past page is a trading object page (second trading object page) that has been already displayed on the user terminal 10, and the display items of the past page are completely or almost the same as those of the next page.

A method of specifying the past page is not particularly limited. For example, if the URL of the trading object page that is currently displayed on the user terminal 10 is contained in the HTTP request, the specifying unit 33a may specify the trading object page as the past page.

Further, the specifying unit 33a may read the viewing history (one or more viewing information) corresponding to the user ID contained in the HTTP request from the viewing history database 22, and specify the past page based on the way of page transition in the user terminal 10 obtained from the viewing history.

For example, when there is one trading object page where page transition with the next page occurs twice or more, the specifying unit 33a may specify the trading object page as the past page. For example, when the page transition of "page Wx->page Wy->page Wx (next page)" occurs, the specifying unit 33a specifies the page Wy as the past page.

Alternatively, the specifying unit 33a may specify the trading object page displayed most recently among the pages that have been displayed on the user terminal 10 for a specified period of time or longer (for example, for 1 minute or longer) as the past page. For example, assuming that the threshold is 1 minute, when the page transition of "page Wv (viewing time: 3 minutes)->page Wx (viewing time: 1 minute)->page Wy (viewing time: 5 seconds)->page Wz (next page)" occurs, the specifying unit 33a specifies the page Wx as the past page.

In this manner, by specifying the past page by taking the page transition or the display time into consideration, it is possible to accurately estimate the trading objects to be compared by a user.

Although a method of specifying the past page is arbitrary as described above, the specifying unit 33a outputs the URL indicating the past page to the comparison unit 33b in any manner.

The comparison unit 33b is a means of comparing the trading object information (first trading object information) displayed on the next page and the trading object information (second trading object information) displayed on the past page. First, the comparison unit 33b extracts the trading object information (next page information) corresponding to the URL of the next page contained in the HTTP request and the trading object information (past page information) corresponding to the URL of the specified past page from the page information database 21. The comparison unit 33b then compares the values of the both pages for each item and thereby specifies the consistency and the discrepancy between the next page information and the past page information. In this case, the comparison unit 33b can specify the consistency and the discrepancy only for the item that is worth comparing for a user.

The processing of the comparison unit 33b is described with reference to FIG. 6. FIG. 6 shows accommodation facilities as a trading object, and the trading object information contains a facility name, address, check-in time, check-out time, access, feature facilities and the like. FIG. 6(a) shows the case where the past page is a webpage of a hotel A and the next page is a webpage of an inn B. On the other hand, FIG. 6(b) shows the case where the past page is a webpage of the inn B and the next page is a webpage of the hotel A. The underline in FIG. 6 indicates that the next page information is different from the past page information.

In the example of FIG. 6, the comparison unit 33b does not make a comparison for the facility name and the address, which are different between the trading objects as a matter of course, and makes a comparison only for the other items. In FIG. 6(a), the check-out time, access, and some of feature facilities ("open-air bath (reserved)" and "hot spring") of the inn B are different from the hotel A, and the other values are consistent with those of the hotel A. In FIG. 6(b), the check-out time, access, and some of feature facilities ("open-air bath" and "laundry service") of the hotel A are different from the inn B, and the other values are consistent with those of the inn B.

After extracting the consistency and the discrepancy in this manner, the comparison unit 33b outputs the consistency and the discrepancy as a comparison result to the page generation unit 33c.

The page generation unit 33c is a means of generating the trading object page indicated by the HTTP request, which is the next page. The page generation unit 33c reads the page information corresponding to the URL contained in the HTTP request from the page information database 21 and generates the next page based on the page information. The page generation unit 33c then processes the generated next page so that at least one of the consistency and the discrepancy between the next page information and the past page information is visually recognizable to a user based on the comparison result input from the comparison unit 33b.

For example, the page generation unit 33c may highlight only the discrepancy (difference information). In this case, only the item for which a value in the next page is advantageous compared to a value in the past page (the item that is advantageous to the user) may be highlighted based on the relative merits of values that have been set and stored in the page generation unit 33c. Examples of advantageous items include an item for which the next page is advantageous compared to the past page for a user (for example, a lower price is advantageous for the price, and a later time is advantageous for the check-out time), an item that does not exist in the past page information and exists in the next page information, an item that is optional in the past page and standard in the next page and the like.

FIG. 7 shows one example of highlighted display where the relative merits are taken into consideration as described above. FIG. 7(a) shows the case where a page Wb of the "inn B" is displayed after a page Wa of the "hotel A". In the example of FIG. 7(a), the check-out time is later in the inn B than in hotel A, which is advantageous for a user, and the item of the check-out time is highlighted. Further, the items of "courtesy bus available" and "hot spring" exist in the inn B while not existing in the hotel A, which is advantageous for a user, and those two items are also highlighted. Further, an open-air bath is provided in both of the hotel A and the inn B but only the inn B has a reservation service, and the item of the open-air bath is also highlighted.

On the other hand, FIG. 7(b) shows the case where the page Wa of the "hotel A" is displayed after the page Wb of the "inn B". In this case, the items of "parking available" and "laundry service" exist in the hotel A while not existing in the inn B, which is advantageous for a user, and those two items are highlighted.

Figure 8:
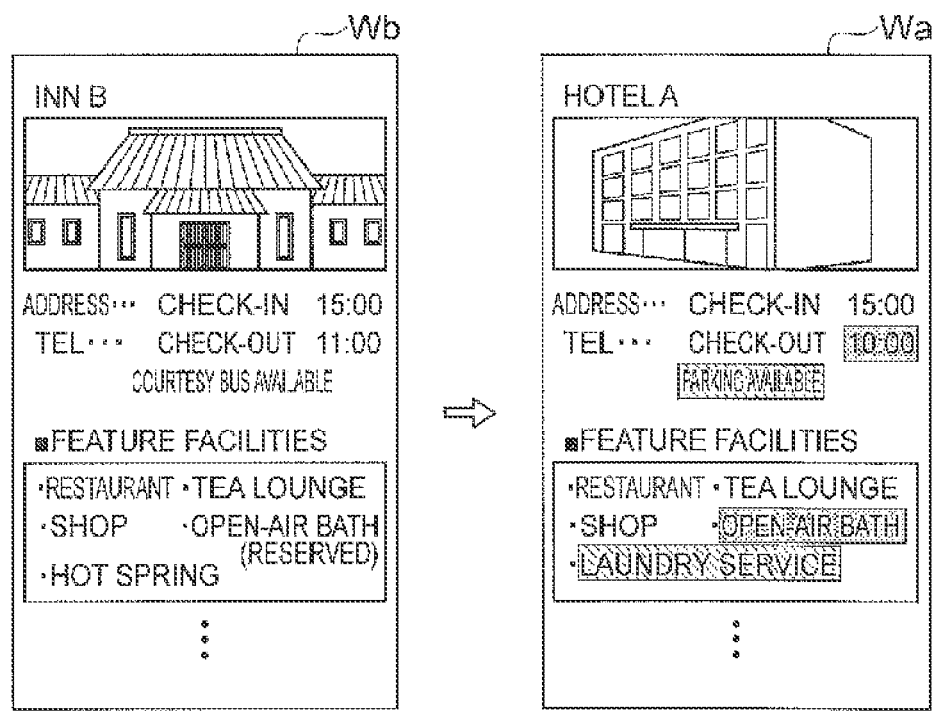
FIG. 8 is a diagram showing another display example of the next page.

Alternatively, the page generation unit 33c may highlight the item for which a value in the next page is advantageous compared to a value in the past page with a first color and highlight the item for which a value in the next page is disadvantageous compared to a value in the past page (the item that is disadvantageous to the user) with a second color. In the example of FIG. 8, among the items in the page Wa of the hotel A, the check-out time and the "open-air bath", which are disadvantageous compared to the inn B, are highlighted.

A method of representing the consistency and the discrepancy on the next page is not limited to highlight display.

For example, a comparative chart indicating the consistency and the discrepancy may be displayed in a separate window. The page generation unit 33c outputs data of the next page to which a comparison result (comparison information) is added to the page transmitting unit 34.

The page transmitting unit 34 is a means of transmitting the trading object page (next page) generated in the request processing unit 33 to the user terminal 10. The transmitted trading object page is displayed on the user terminal 10.

Figure 9:
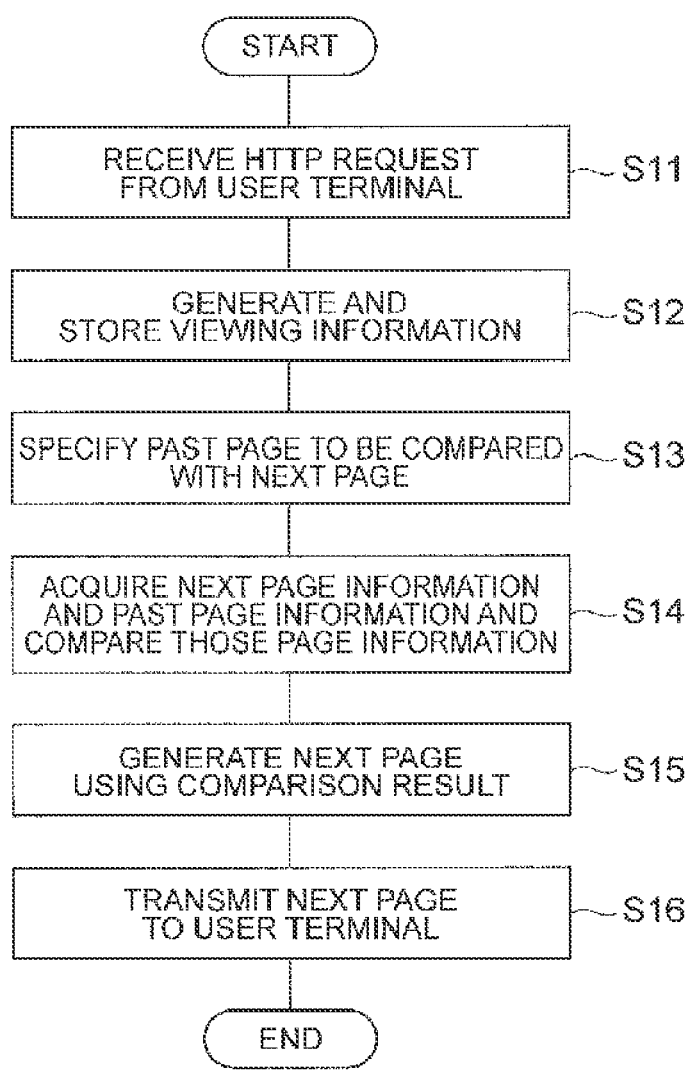
FIG. 9 is a flowchart showing an operation of the information providing device shown in FIG. 1.

The operation of the information providing device 30 is described, and further, an information providing method according to this embodiment is described hereinafter with reference to FIG. 9.

First, the request receiving unit 31 receives an HTTP request for the next page from the user terminal (Step S11). Next, the viewing history recording unit 32 generates viewing information based on the HTTP request and stores the viewing information into the viewing history database 22 (Step S12).

Then, the request processing unit 33 processes the HTTP request. Specifically, the specifying unit 33a specifies the past page to be compared with the next page by referring to the viewing history database 22 (Step S13, specifying step). The comparison unit 33b then acquires the next page information and the past page information from the page information database 21 and compares the two page information (Step S14, comparison step). The page generation unit 33c then generates the next page based on the comparison result (Step S15). In this step, the page generation unit 33c generates the trading object page on which the comparison result (the consistency or the discrepancy) between the trading objects is displayed on the next page or the comparison result is displayed side by side with the next page by using the various ways of expression as described above.

Finally, the page transmitting unit 34 transmits the generated next page to the user terminal 10 (Step S16, presentation step). The user can thereby see the consistency and the discrepancy between the trading objects at a glance.

Figure 10:
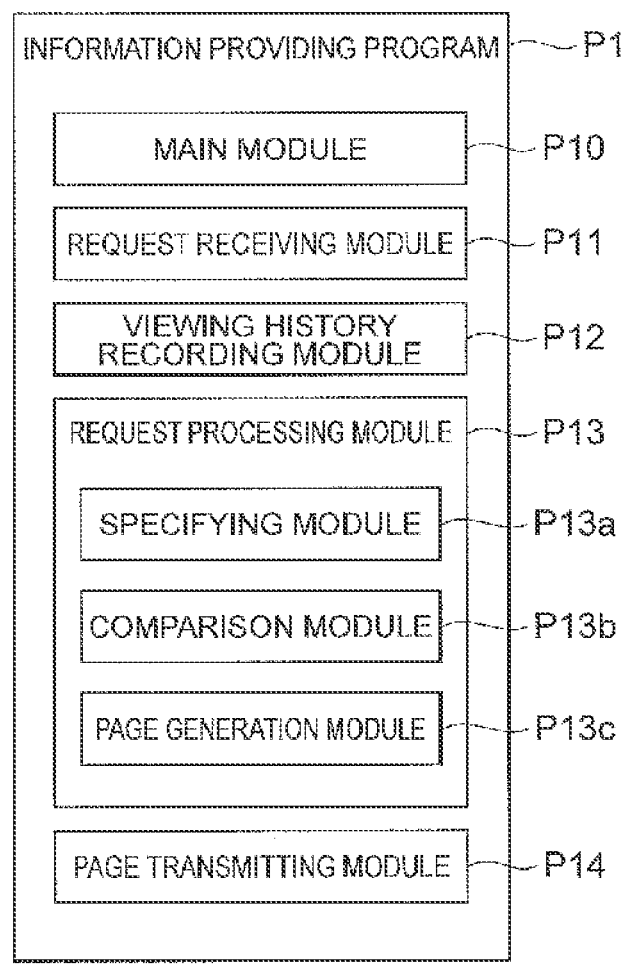
FIG. 10 is a diagram showing a configuration of an information providing program according to the first embodiment.

Hereinafter, an information providing program that causes a computer to function as the information providing device 30 is described with reference to FIG. 10.

An information providing program P1 includes a main module P10, a request receiving module P11, a viewing history recording module P12, a request processing module P13, and a page transmitting module P14. The request processing module P13 includes a specifying module P13a, a comparison module P13b, and a page generation module P13c.

The main module P10 is a part that exercises control over the information providing functions. The functions implemented by executing the request receiving module P11, the viewing history recording module P12, the request processing module P13, and the page transmitting module P14 are equal to the functions of the request receiving unit 31, the viewing history recording unit 32, the request processing unit 33, and the page transmitting unit 34 described above, respectively. Further, the functions implemented by executing the specifying module P13a, the comparison module P13b, and the page generation module P13c are equal to the functions of the specifying unit 33a, the comparison unit 33b, and the page generation unit 33c described above, respectively.

The information providing program P1 is provided in the form of being recorded in a static manner on a recording medium such as CD-ROM or DVD-ROM or semiconductor memory, for example. Further, the information providing program P1 may be provided as a computer data signal superimposed onto a carrier wave through a communication network.

As described above, according to this embodiment, the past page to be compared with the next page that is displayed next is specified based on the viewing history, and the trading object information to be displayed on the both pages are compared. Then, the comparison result is transmitted to the user terminal 10. In this manner, by automatically extracting the comparison result of the trading object information viewed by a user and presenting it to the user, the user can compare the trading objects more easily.

Further, because there is no need for a user to perform an operation for comparison, a page request and a data acquisition request from the user terminal 10 can be reduced, which allows a decrease in the load on the network or the load on the server.

Furthermore, because the comparison result is displayed within the next page, the page is easy to view for a user.

Second Embodiment

An information providing system 2 according to the second embodiment is described hereinafter with reference to FIGS. 11 to 15. The second embodiment is different from the first embodiment in that a part of the trading object information in the next page is changed based on comparison with the past page, in addition to presenting the comparison information. Hereinafter, the same or similar matters as in the first embodiment are not redundantly described.

Figure 11:
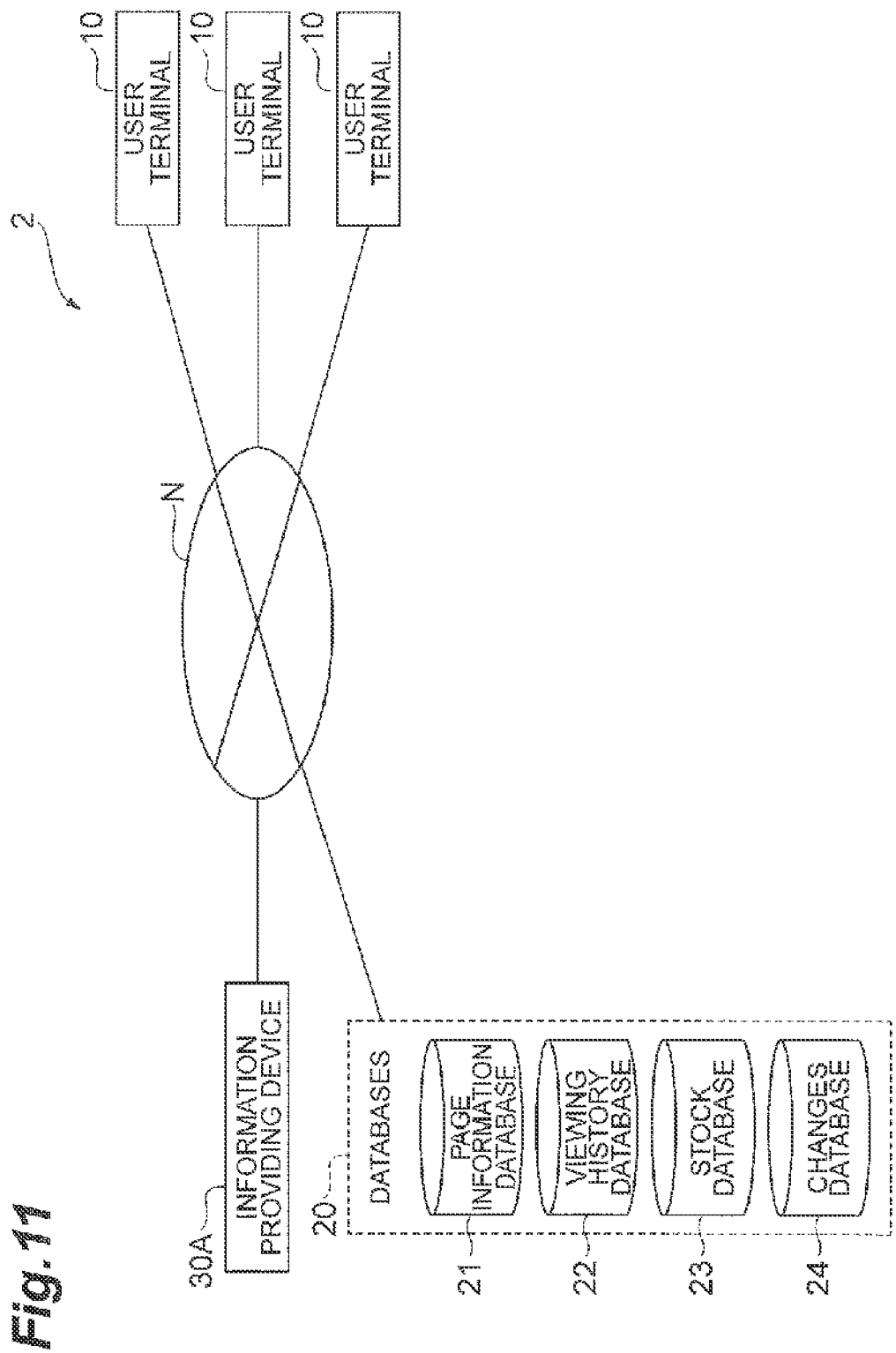
FIG. 11 is a diagram showing an overall configuration of an information providing system according to a second embodiment.

As shown in FIG. 11, the databases 20 further include a stock database (stock storage unit) 23 and a changes database 24 in this embodiment.

Figure 12:
FIG. 12 is a diagram showing an example of stock information.

The stock database 23 is a means of storing stock information of trading objects. As shown in FIG. 12, the stock information contains an offerer ID, a trading object ID, the initial number of stocks, the number of orders made (number of orders), and the current number of stocks. The number of orders made is the number of orders such as purchases and reservations fixed between a user and an offerer. The sum of the number of orders made and the current number of stocks equals the initial number of stocks. Note that, in the case where trading objects are public facilities such as a room of accommodation facilities or golf courses, the stock information contains a date of use in addition to the items shown in FIG. 12.

The changes database 24 is a means of storing changes information indicating possible changes based on a comparison result with the past page when the trading object page is displayed. As shown in FIG. 13, the changes information contains an offerer ID, a trading object ID, URL of a trading object page, and one or more possible changes. The possible changes are information composed of an item for which a change can be made and an initial value and a changed value for the item. For example, FIG. 13 shows that the check-out time of a trading object (accommodation facility) that is identified by the offerer ID "1001" and the trading object ID "A001" can be changed from the initial value "10:00" to "11:00" or "12:00" and that a courtesy bus service for the trading object can be changed from "not available" to "available". As in the check-out time and the price in FIG. 13, a plurality of candidates may be prepared for a changed value.

Figure 14:
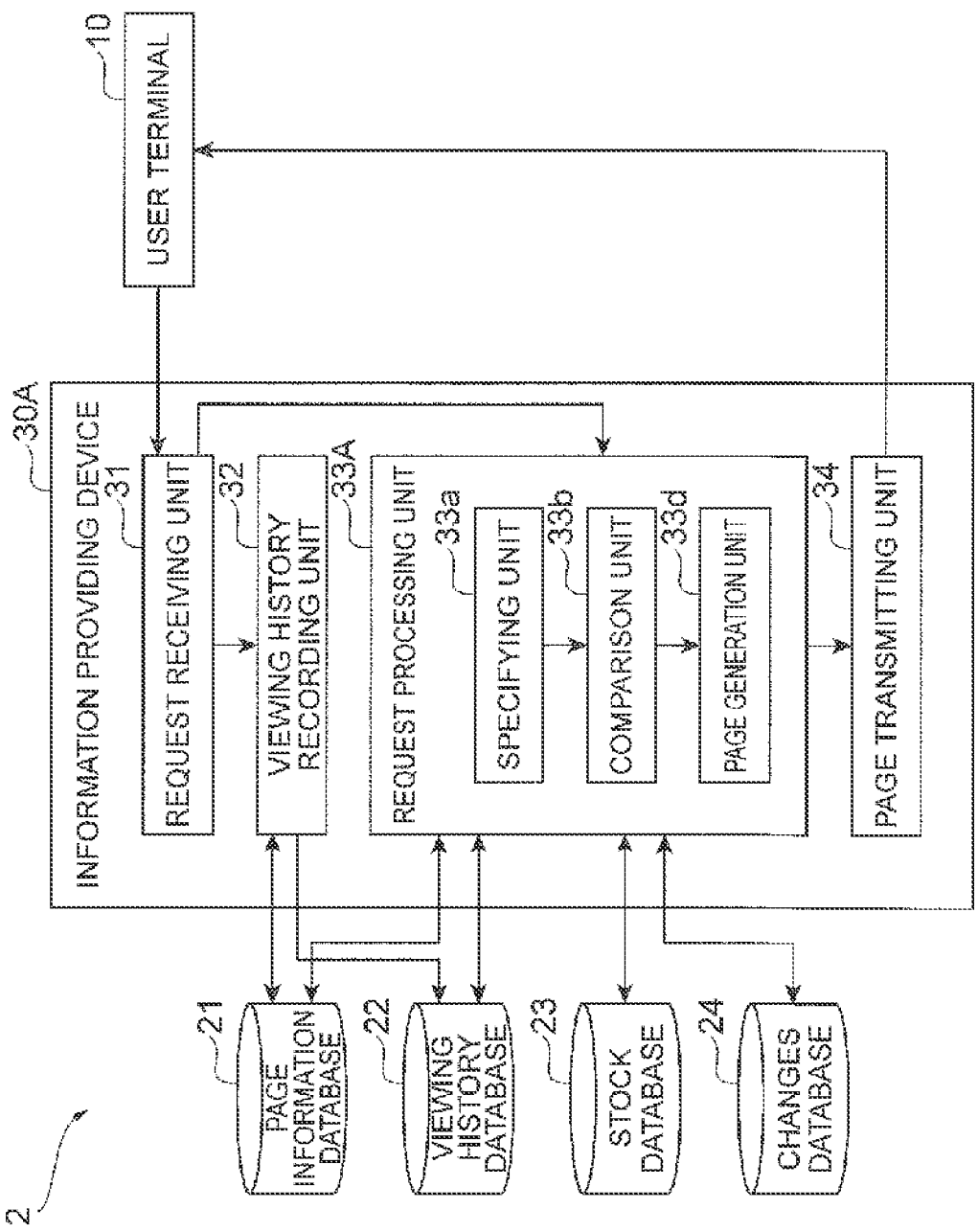
FIG. 14 is a block diagram showing a functional configuration of the information providing device shown in FIG. 11.

Next, an information providing device 30A according to this embodiment is described. As shown in FIG. 14, the information providing device 30A includes a request processing unit 33A in place of the request processing unit 33 according to the first embodiment. The request processing unit 33A includes a page generation unit 33d in place of the page generation unit 33c according to the first embodiment. Hereinafter, the request processing unit 33A and particularly the page generation unit 33d, which are different from those of the first embodiment, are described, and the other functional components are not redundantly described.

The request processing unit 33A is a means of generating a trading object page corresponding to an input HTTP request. The request processing unit 33A includes the specifying unit 33a and the comparison unit 33b, which are the same as those of the first embodiment, and the page generation unit 33d, which is peculiar to this embodiment.

The page generation unit 33d is a means of generating the next page indicated by the HTTP request. The page generation unit 33d reads the page information corresponding to the URL contained in the HTTP request from the page information database 21 and generates the next page based on the page information. The page generation unit 33d then changes a part of information in the next page based on the comparison result input from the comparison unit 33b. Specifically, the page generation unit 33d determines whether there is an item (which is referred to hereinafter as "disadvantageous item") for which a value in the next page is disadvantageous compared to a value in the past page. When there is a disadvantageous item, the page generation unit 33d extracts possible changes information corresponding to the URL of the next page from the changes database 24. The page generation unit 33d then changes the value of the disadvantageous item in the next page to the same value as the corresponding value in the past page or to a value that is more advantageous than the corresponding value in the past page based on the possible changes indicated by the extracted possible changes information and the value in the past page.

FIG. 15 shows an example of changes by the page generation unit 33d. FIG. 15 shows processing in the case where a page Wa of the hotel A is displayed after a page Wb of the inn B is displayed on the user terminal 10. In the example of FIG. 15, the check-out time "10:00", which is the item that is disadvantageous compared to that of the inn B, is changed to "11:00", which is the same as in the inn B, and a courtesy bus service, which is offered by the inn B, is added as a service of the hotel A. Then, the changed or added items are highlighted. Note that, the two items of "parking available" and "laundry service", for which the hotel A has an advantage over the inn B from the first, are highlighted in the same way as in the first embodiment.

The page generation unit 33d may change a value of the disadvantageous item only when the trading object indicated by the next page satisfies predetermined conditions, rather than changing a value of the disadvantageous without condition as described above.

For example, the page generation unit 33d may read the stock information corresponding to the offerer ID and the trading object ID of the next page from the stock database 23 and, when an order rate that is obtained by dividing the number of orders made by the initial number of stocks is a first threshold or less, change the disadvantageous item to the same value as the corresponding value in the past page. Further, based on the stock information, when the order rate is a second threshold or less, the page generation unit 33d may change the disadvantageous item to a value that is more advantageous than the corresponding value in the past page. The second threshold is smaller than the first threshold. For example, in the processing shown in FIG. 15, the page generation unit 33d may change the check-out time of the hotel A to "11:00", which is the same as that of the hotel B, when the order rate is 80% (first threshold) or less, and change it to "12:00", which is more advantageous than that of the hotel B, when the order rate is 60% (second threshold) or less.

Note that the first and second thresholds may be fixed values or values on the basis of the order rate of the previous year or the like. Further, a period of calculation for the order rate is not limited. For example, the page generation unit 33d may calculate the average value over a specific period or calculate an actual performance value for the previous year during a period from a date when a user makes a search to a date of use.

Further, the page generation unit 33d may change the disadvantageous item in the next page to the same value as the corresponding value in the past page or a value that is more advantageous than the corresponding value in the past page based on a rival relationship between trading objects. In this case, the page generation unit 33d previously stores relationship information that contains a plurality of offerer IDs which are considered to stand as rivals to one another. The page generation unit 33d then compares the two offerer IDs corresponding to the next page and the past page and the relationship information and determines whether two offerers identified by those offerer IDs have a rival relationship with each other. When the two offerers are rivals to each other, the page generation unit 33d changes a value of the disadvantageous item in the next page to a more advantageous value than the corresponding value in the past page or, if it is not possible, to the same value as the corresponding value in the past page by referring to the changes database 24.

Note that, in the case where the relationship information indicates a one-way rival relationship, the page generation unit 33d changes a value of the disadvantageous item as described above only when page transition occurs in the direction opposite to the one-way direction. For example, it is assumed that a "hotel Y" is set as a rival to a "hotel X" and the "hotel X" is not set as a rival to the "hotel Y". In this case, the relationship between the hotels X and Y can be represented as "a rival relationship from the hotel X to the hotel Y (hotel X->hotel Y)". When page transition from the "hotel Y" to the "hotel X" occurs, the page generation unit 33d changes a value of the disadvantageous item as described above. On the other hand, when page transition from the "hotel X" to the "hotel Y" occurs, the page generation unit 33d does not make any changes to an item value.

The page generation unit 33d outputs data of the next page in which some value has been changed to the page transmitting unit 34. When there is no disadvantageous item, the page generation unit 33d can output data of the next page in which a comparison result is displayed to the page transmitting unit 34 as in the first embodiment. The next page generated by the page generation unit 33d is displayed from the page transmitting unit 34 to the user terminal 10.

As described above, in this embodiment also, the past page to be compared with the next page that is displayed next is specified based on the viewing history, and the trading object information to be displayed on the both pages are compared. Then, the comparison result is transmitted to the user terminal 10. In this manner, by automatically extracting the comparison result of the trading object information viewed by a user and presenting it to the user, the user can compare the trading objects more easily. Further, because a user's operation for comparison is not needed, a page request and a data acquisition request from the user terminal 10 can be reduced, which allows a decrease in the load on the network or the load on the server.

In addition, in this embodiment, a display item in the next page which is disadvantageous compared to information in the past page is changed to a value that is more advantageous than an initial value based on the corresponding value in the past page. A user can thereby obtain more favorable information.

Embodiments of the present invention are described in detail above. However, the present invention is not limited to the above-described embodiments. Various changes and modifications may be made to the present invention without departing from the scope of the invention.

The present invention can be applied also to the case where the user terminal 10 has a browser that changes display pages by tab switching in one window. In this case, each time tab switching is done, the user terminal 10 transmits a switching signal indicating the switching to the information providing device 30 or 30A. The switching signal contains a user ID and URL of a trading object page to be displayed after switching. In the information providing device 30, the request receiving unit 31 receives the switching signal, and the viewing history recording unit 32 stores viewing information into the viewing history database 22 in the same manner as described in the above embodiment based on the switching signal. Further, in response to the signal, the request processing unit 33 or 33A embeds a comparison result into the webpage (next page) to be displayed after the switching operation in the same way as described in the above embodiment. Then, the page transmitting unit 34 transmits the webpage to the user terminal 10.

The present invention can be applied also to the case of comparing three or more trading objects. In this case, the specifying unit 33a may specify all or some of a plurality of trading object pages that have been displayed from when the first trading object page has been displayed last time to when the page has been displayed as the next page as the past pages. For example, when the page transition of "page A->page B->page C->page B->page A (next page)" occurs, the specifying unit 33a may specify the pages B and C as the past pages. Further, the specifying unit 33a may specify only the page that has been displayed a predetermined number of times or more during the page transition as the past page. In the above example, if a threshold is 2, the specifying unit 33a specifies the page B only.

Alternatively, the specifying unit 33a may specify a plurality of trading object pages that have been displayed for a specified period of time or longer within a specified range of time as the past pages. For example, assuming that the time range is 10 minutes and the threshold is 1 minute, when the page transition of "page Wv (viewing time: 4 minutes)->page Wx (viewing time: 1 minute)->page Wy (viewing time: 5 seconds)->page Wz (next page)" occurs, the specifying unit 33a specifies the pages Wv and Wx as the past pages.

In the case of displaying a result of comparing three or more trading objects, the page generation unit 33c or 33d may highlight each comparison item with a color corresponding to the rank among those trading objects. Alternatively, the page generation unit 33c or 33d may highlight only the item ranked at the top or only the items ranked at the top and the bottom.

The specifying unit 33a may specify a page of a trading object for which the same page transition as the page transition for a trading object to be displayed next is done as the past page. For example, when the page transitions like "a plan page of the hotel X"->"a detailed page of the hotel X"->"a plan page of the hotel Y"->"a detailed page of the hotel Y (next page)", the specifying unit 33a may specify the "detailed page of the hotel X" as the past page. Further, when the page transitions like "a plan page of the hotel X"->"a detailed page of the hotel X"->"a plan page of the hotel Y (next page)" as well, the specifying unit 33a may specify the "detailed page of the hotel X" as the past page.

REFERENCE SIGNS LIST

1 and 2 . . . information providing system, 10 . . . user terminal, 20 . . . databases, 21 . . . page information database, 22 . . . viewing history database, 23 . . . stock database, 24 . . . changes database, 30 and 30A . . . information providing device, 31 . . . request receiving unit, 32 . . . viewing history recording unit, 33 and 33A . . . request processing unit, 33a . . . specifying unit, 33b . . . comparison unit, 33c and 33d . . . page generation unit, 34 . . . page transmitting unit, P1 . . . information providing program, P10 . . . main module, P11 . . . request receiving module, P12 . . . viewing history recording module, P13 . . . request processing module, P13a . . . specifying module, P13b . . . comparison module, P13c . . . page generation module, P14 . . . page transmitting module

The invention claimed is:

1. An information providing system comprising:
at least one memory operable to store program code;
at least one memory operable to store a plurality of webpages of a plurality of trading objects and a viewing history of the plurality of webpages of the plurality of trading objects corresponding to a user identifier (ID); and
at least one processor operable to read the program code and operate as instructed by the program code, the program code including:
receiving code configured to cause at least one of at least one processor to receive, from a user terminal, an HTTP (Hypertext Transfer Protocol) request for displaying a first webpage of a first trading object, the HTTP request including the user ID and a URL of the first webpage;
request processing code configured to cause at least one of at least one processor to process the HTTP request for displaying the first webpage, the request processing code comprising:
specifying code configured to cause at least one of said at least one processor to, in response to the HTTP request for displaying the first webpage, automatically specify a second webpage of a second trading object which has been displayed on the user terminal prior to displaying the first webpage, by referring to the at least one memory operable to store the plurality of webpages of the plurality of trading objects and the viewing history of the plurality of webpages of the plurality of trading objects corresponding to the user ID;
comparison code configured to cause at least one of said at least one processor to, in response to the HTTP request for displaying the first webpage and without receiving a request for comparison result between attributes of the first trading object and the second trading object, automatically perform extracting first information of the first trading object and second information of the second trading object from a trading object storage that stores information of the plurality of trading objects, the first information of the first trading object including a plurality of first attributes corresponding to the first trading object, the second information including a plurality of second attributes corresponding to the second trading object, comparing the plurality of first attributes corresponding to the first trading object with the plurality of second attributes corresponding to the second trading object, and identifying at least one of the plurality of first attributes corresponding to the first trading object to be highlighted, wherein the identified at least one of the plurality of first attributes to be highlighted comprises at least one of:

a lower price of the first trading object than a price corresponding to the second trading object;

a later check-out time of the first trading object than a check-out time corresponding to the second trading object;

an item that exists in the first information of the first trading object but does not exist in the second information of the second trading object; and an item that is standard in the first trading object but is optional in the second trading object; and generation code configured to cause at least one of said at least one processor to, in response to the HTTP request for displaying the first webpage, automatically generate the first webpage of the first trading object so as to highlight, among the first information of the first trading object, the at least one of the plurality of first attributes identified by the comparison code; and presentation code configured to cause at least one of said at least one processor to, in response to the HTTP request for displaying the first webpage, automatically present the first webpage of the first trading object to the user terminal in which, among the first information of the first trading object, the at least one of the plurality of first attributes identified by the comparison code is highlighted, wherein the request processing code further comprises:

second comparison code configured to cause at least one of said at least one processor to, in response to the HTTP request for displaying the first webpage, automatically compare the plurality of first attributes corresponding to the first trading object with the plurality of second attributes corresponding to the second trading object, and identify another at least one of the plurality of first attributes that comprises at least one of:

a higher price of the first trading object than the price corresponding to the second trading object;

an earlier check-out time of the first trading object than the check-out time corresponding to the second trading object;

an item that does not exist in the first information of the first trading object but exists in the second information of the second trading object; and an item that is optional in the first trading object but is standard in the second trading object, and second generation code configured to cause at least one of said at least one processor to:

extract possible changes information, from a changes database configured to pre-store information indicating one or more changes that can be made with respect to the first trading object;

change at least a part of the another at least one of the plurality of first attributes identified by the second comparison code when the extracted possible change information specifies a change that can be made for the at least a part of the another at least one of the plurality of first attributes; and generate the first webpage of the first trading object including the changed at least a part of the another at least one of the plurality of first attributes, and wherein changing the at least a part of the another at least one of the plurality of first attributes comprises at least one of:

changing the higher price of the first trading object to the price corresponding to the second trading object;

changing the earlier check-out time of the first trading object to the check-out time corresponding to the second trading object;

adding the item that does not exist in the first information of the first trading object but exists in the second information of the second trading object, to the first information of the first trading object; and changing the item that is optional in the first trading object as standard.

2. The information providing system according to claim 1, wherein the specifying code is further configured to cause at least one of said at least one processor to specify at least one of the plurality of webpages of the plurality of trading objects displayed during a period from when the first webpage is initially displayed to when the first webpage is displayed as the second webpage.

3. The information providing system according to claim 1, wherein the specifying code is further configured to cause at least one of said at least one processor to specify at least one of said plurality of webpages of the plurality of trading objects that has been displayed for at least a pre-set amount of time as the second webpage.

4. The information providing system according to claim 1, wherein the generation code is further configured to cause at least one of said at least one processor to calculate an order rate of the first trading object indicated by the first webpage by referring to a stock storage that stores a number of stocks and a number of orders for trading objects, and change the at least a part of the another at least one of the plurality of first attributes when the order rate for the first trading object is equal to or less than a first threshold.

5. The information providing system according to claim 1, wherein the generation code is further configured to cause at least one of said at least one processor to determine whether a first offerer corresponding to the first information and a second offerer corresponding to the second information have a specified relationship by referring to preset relationship information indicating a specified relationship between offerers who offer trading objects, and change the at least a part of the another at least one of the plurality of first attributes when both the first and second offerers have the specified relationship.

6. The information providing system according to claim 1, wherein the specifying code is further configured to cause at least one of said at least one processor to specify at least one of said plurality of webpages that has been displayed for the longest amount of time as the second webpage.

7. The information providing system according to claim 1, wherein
the specifying code is further configured to cause at least one of said at least one processor to specify at least one of said plurality of webpages that has been displayed immediately prior to the first webpage as the second webpage.

8. The information providing system according to claim 1, wherein the specifying code causes at least one of said at least one processor to, in response to the HTTP request for displaying the first webpage, automatically specify the second webpage of the second trading object based on satisfaction of a condition that the second webpage has been displayed for a preset threshold time interval or longer.

9. The information providing system according to claim 1, wherein the specifying code causes at least one of said at least one processor to, in response to the HTTP request for displaying the first webpage, automatically specify the second webpage of the second trading object based on satisfaction of a condition that the second webpage has been displayed a preset threshold number of times or more.

10. An information providing method executed by an information providing system, the method comprising:
receiving, from a user terminal, an HTTP (Hypertext Transfer Protocol) request for displaying a first webpage of a first trading object, the HTTP request including a user identifier (ID) and a URL of the first webpage; and
processing the HTTP request for displaying the first webpage by performing:
in response to the HTTP request for displaying the first webpage, automatically specifying a second webpage of a second trading object which has been displayed on the user terminal prior to displaying the first webpage, by referring to the at least one memory operable to store the plurality of webpages of the plurality of trading objects and the viewing history of the plurality of webpages of the plurality of trading objects corresponding to the user ID;
in response to the HTTP request for displaying the first webpage and without receiving a request for comparison result between attributes of the first trading object and the second trading object, automatically perform extracting, automatically extracting first information of the first trading object and second information of the second trading object from a trading object storage that stores information of the plurality of trading objects, the first information of the first trading object including a plurality of first attributes corresponding to the first trading object, the second information including a plurality of second attributes corresponding to the second trading object, automatically comparing the plurality of first attributes corresponding to the first trading object with the plurality of second attributes corresponding to the second trading object, and automatically identifying at least one of the plurality of first attributes corresponding to the first trading object to be highlighted, wherein the identified at least one of the plurality of first attributes to be highlighted comprises at least one of:
a lower price of the first trading object than a price corresponding to the second trading object;
a later check-out time of the first trading object than a check-out time corresponding to the second trading object;
an item that exists in the first information of the first trading object but does not exist in the second information of the second trading object; and
an item that is standard in the first trading object but is an optional in the second trading object;
in response to the HTTP request for displaying the first webpage, automatically generating the first webpage of the first trading object so as to highlight, among the first information of the first trading object, the at least one of the plurality of first attributes identified to be highlighted; and
in response to the HTTP request for displaying the first webpage, automatically presenting the generated first webpage of the first trading object to the user terminal in which, on the generated first webpage, the at least one of the plurality of first attributes is highlighted,
wherein the processing the HTTP request further comprises:
in response to the HTTP request for displaying the first webpage, automatically comparing the plurality of first attributes corresponding to the first trading object with the plurality of second attributes corresponding to the second trading object, and identifying another at least one of the plurality of first attributes that comprises at least one of:
a higher price of the first trading object than the price corresponding to the second trading object;
an earlier check-out time of the first trading object than the check-out time corresponding to the second trading object;
an item that does not exist in the first information of the first trading object but exists in the second information of the second trading object; and
an item that is optional in the first trading object but is standard in the second trading object;
extracting possible changes information, from a changes database configured to pre-store information indicating one or more changes that can be made with respect to the first trading object;
changing at least a part of the another at least one of the plurality of first attributes when the extracted possible change information specifies a change that can be made for the at least a part of the another at least one of the plurality of first attributes; and
generating the first webpage of the first trading object including the changed at least a part of the another at least one of the plurality of first attributes, and
wherein the changing the at least a part of the another at least one of the plurality of first attributes comprises at least one of:
changing the higher price of the first trading object to the price corresponding to the second trading object;
changing the earlier check-out time of the first trading object to the check-out time corresponding to the second trading object;
adding the item that does not exist in the first information of the first trading object but exists in the second information of the second trading object, to the first information of the first trading object; and
changing the item that is optional in the first trading object as standard.

11. A non-transitory computer-readable storage medium having stored thereon a program for displaying a plurality of objects on a touch panel which when executed by a computer causes the computer to:
  receive, from a user terminal, an HTTP (Hypertext Transfer Protocol) request for displaying a first webpage of a first trading object, the HTTP request including a user identifier (ID) and a URL of the first webpage; and
  process the HTTP request for displaying the first webpage by performing:
    in response to the HTTP request for displaying the first webpage, automatically specifying a second webpage of a second trading object which has been displayed on the user terminal prior to displaying the first webpage, by referring to the at least one memory operable to store the plurality of webpages of the plurality of trading objects and the viewing history of the plurality of webpages of the plurality of trading objects corresponding to the user ID;
    in response to the HTTP request for displaying the first webpage and without receiving a request for comparison result between attributes of the first trading object and the second trading object, automatically perform extracting, automatically extracting first information of the first trading object and second information of the second trading object from a trading object storage that stores information of the plurality of trading objects, the first information of the first trading object including a plurality of first attributes corresponding to the first trading object, the second information including a plurality of second attributes corresponding to the second trading object, automatically comparing the plurality of first attributes corresponding to the first trading object with the plurality of second attributes corresponding to the second trading object, and automatically identifying at least one of the plurality of first attributes corresponding to the first trading object to be highlighted, wherein the identified at least one of the plurality of first attributes to be highlighted comprises at least one of:
      a lower price of the first trading object than a price corresponding to the second trading object;
      a later check-out time of the first trading object than a check-out time corresponding to the second trading object;
      an item that exists in the first information of the first trading object but does not exist in the second information of the second trading object; and
      an item that is standard in the first trading object but is an optional in the second trading object;
    in response to the HTTP request for displaying the first webpage, automatically generating the first webpage of the first trading object so as to highlight, among the first information of the first trading object, the at least one of the plurality of first attributes identified to be highlighted; and
    in response to the HTTP request for displaying the first webpage, automatically presenting the generated first webpage of the first trading object to the user terminal in which, on the generated first webpage, the at least one of the plurality of first attributes is highlighted,
  wherein the processing the HTTP request further comprises:
    in response to the HTTP request for displaying the first webpage, automatically comparing the plurality of first attributes corresponding to the first trading object with the plurality of second attributes corresponding to the second trading object, and identifying another at least one of the plurality of first attributes that comprises at least one of:
      a higher price of the first trading object than the price corresponding to the second trading object;
      an earlier check-out time of the first trading object than the check-out time corresponding to the second trading object;
      an item that does not exist in the first information of the first trading object but exists in the second information of the second trading object; and
      an item that is optional in the first trading object but is standard in the second trading object;
    extracting possible changes information, from a changes database configured to pre-store information indicating one or more changes that can be made with respect to the first trading object;
    changing at least a part of the another at least one of the plurality of first attributes when the extracted possible change information specifies a change that is possible for the at least a part of the another at least one of the plurality of first attributes; and
    generating the first webpage of the first trading object including the changed at least a part of the another at least one of the plurality of first attributes, and
    wherein the changing the at least a part of the another at least one of the plurality of first attributes comprises at least one of:
      changing the higher price of the first trading object to the price corresponding to the second trading object;
      changing the earlier check-out time of the first trading object to the check-out time corresponding to the second trading object;
      adding the item that does not exist in the first information of the first trading object but exists in the second information of the second trading object, to the first information of the first trading object, and
      changing the item that is optional in the first trading object as standard.

* * * * *